United States Patent
Sivan (10) Patent No.: US 6,411,652 B1
(45) Date of Patent: Jun. 25, 2002

(54) MOTION ESTIMATION (75) Inventor: Zohar Sivan, Haifa (IL)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/177,756

(22) Filed: Oct. 23, 1998

(51) Int. Cl.[7] .................................................. H04N 7/18
(52) U.S. Cl. ........................... 375/240.16; 375/240.15; 375/240.13
(58) Field of Search ...................... 375/240.13, 240.14, 375/240.15, 240.16, 240.17

(56) References Cited

U.S. PATENT DOCUMENTS

| | | | | |
|---|---|---|---|---|
| 5,151,784 A | * | 9/1992 | Lavagetto et al. | 375/240.17 |
| 5,640,552 A | | 6/1997 | Yianilos | |
| 5,757,432 A | | 5/1998 | Dulong et al. | 348/384 |
| 5,764,787 A | | 6/1998 | Nickerson | 382/107 |
| 5,774,677 A | | 6/1998 | Wickstrom | 395/200.77 |
| 5,818,969 A | * | 10/1998 | Astle | 382/236 |
| 6,016,163 A | * | 1/2000 | Rodriguez et al. | 375/240.17 |
| 6,128,047 A | * | 10/2000 | Chang et al. | 375/240.16 |
| 6,195,389 B1 | * | 2/2001 | Rodriguez et al. | 375/240.16 |

* cited by examiner

Primary Examiner—Andy Rao
(74) Attorney, Agent, or Firm—Darby & Darby (57) ABSTRACT

A method of comparing a current block in a current frame to a plurality of background blocks in a preceding frame. Each block includes a matrix of data values arranged in a given number of columns. The method uses a processor which has a plurality of computational registers, each register capable of receiving a number of the data values at least equal to the given number. The data values are loaded from a memory beginning at an address in the memory evenly divisible by the given number. The method includes storing the preceding frame in the memory beginning at an address that is divisible by the given number with a predetermined remainder, loading at least some of the data values of the current block into one or more of the plurality of registers, loading at least some of the data values of one or more of the background blocks into another one or more of the plurality of registers, and comparing the background blocks to the current block using the registers.

21 Claims, 11 Drawing Sheets

| K1 |
| K2 |
| K3 |
| K4 |
| · |
| · |
| · |
| · |
| · |
| · |
| K15 |
| K16 |

| Z1 |
| Z2 |
| Z3 |
| Z4 |
| Z5 |
| Z6 |
| Z7 |
| Z8 |
| Z9 |

| R1 |
| R2 |
| R3 |
| R4 |
| R5 |
| R6 |
| R7 |

| ITERATION NUMBER | # OF ROWS | MISALIGNED NUMBER OF LOADS/ROW | ALIGNED NUMBER OF LOADS/ROW | RANDOM ALIGNMENT NUMBER OF LOADS/ROW |
|---|---|---|---|---|
| 1 | 32 | 2 | 3 | 6 |
| 2 | 24 | 1/3 x 2 + 2/3 x 3 | 2/3 x 2 + 1/3 x 3 | 6 |
| 3 | 20 | 7/9 x 2 + 2/9 x 3 | 8/9 x 2 + 1/9 x 3 | 6 |
| 4 | 18 | 25/27 x 2 + 2/27 x 3 | 26/27 x 2 + 1/27 x 3 | 6 |
| TOTAL LOADS | — | 209.7 | 230.8 | 664 |

MOTION ESTIMATION

FIELD OF THE INVENTION

The present invention relates generally to video compression, and specifically to fast determination of relative block motion between successive video frames.

BACKGROUND OF THE INVENTION

Current video compression standards, such as MPEG-1/2/4 and H.261/263, involve estimation of motion of image blocks between consecutive frames in a video sequence being compressed. Most of the images in the sequence are represented by the movements of their blocks relative to earlier frames. During compression, a current block in a current frame is compared to blocks in a preceding frame, to find a block in the preceding frame most closely correlated with the current block. In the compressed frame, the block is indicated by the position of the most closely-correlated block in the preceding frame. The correlation is ordinarily measured by a sum of the absolute differences or squared differences between the values of the respective pixels of the blocks.

Comparison of the blocks, which normally comprise 16×16 pixels each, requires large amounts of processing time. In order to reduce the required time, comparisons are performed only with blocks in a neighborhood of the current block, for example those blocks displaced by up to 15 pixels in either or both of the x and y directions.

To further reduce the number of comparisons, various methods have been introduced in which the current block is compared to a selected number of the blocks in the preceding frame. A number of these methods are described in "Image and Video Compression Standards," by V. Bhaskran, and K. Konstantinides, Kluwer Academic Publishers, 1995, which is incorporated herein by reference. One such method is a two-dimensional search logarithmic method in which the current block (x,y) (wherein x,y are the coordinates of a fixed point in the block, for example, of the top left pixel of the block) is compared iteratively to groups of nine blocks in the preceding frame. In a first iteration, the nine blocks of the preceding frame include a center block, having the same coordinates (x,y) as the current block, and the eight surrounding blocks distanced 8 pixels in one or both of the x and y directions from the center block. The block with the best correlation among the nine blocks is used as a new center block in the second iteration. In the second iteration, the current block is compared to the new center block and the eight surrounding blocks distanced by 4 pixels from the center block. This process is repeated for distances of two pixels and one pixel.

However, even with this and other methods, motion estimation is still one of the most CPU-consuming tasks in video compression. Therefore, further saving of processing time is desired.

In order to efficiently perform tasks, such as block comparisons, which involve performing identical commands on large sets of data, processors with SIMD (Single Instruction, Multiple Data) processing units have been introduced. For example, the AltiVec technology of the PowerPC chip described in the AltiVec web pages at http://www.mot.com/SPS/PowerPC/AltiVec/AvecHome.html, which is incorporated herein by reference, allows performing one command on 16 different 1-byte variables concurrently. Use of the AltiVec technology for block comparison may therefore substantially enhance the performance of the block comparison. However, since large amounts of data are involved, the data cannot be held constantly in registers, and the main memory external to the processor must be accessed repeatedly in order to fetch the blocks of the preceding frame.

In order to simplify the hardware of the SIMD processing unit, memory access of the SIMD unit is ordinarily limited to words consisting of multiple bytes, the first of which begins at a memory location which is aligned to the size of the registers of the unit, i.e., at locations whose addresses are integral multiples of 16 bytes. When it is necessary to compare a block not properly aligned, two load commands must be performed to load each row of the block. For each row, the contents of two 16-byte memory locations containing between them the 16-bytes of the block are loaded, and then a permute command is performed to put the desired 16 bytes in a single register. Since in implementing the search logarithmic method the memory accesses require most of the execution time, it would be highly desired to reduce the number of memory accesses required.

SUMMARY OF THE INVENTION

It is an object of some aspects of the present invention to provide methods for fast block comparison using SIMD units.

It is another object of some aspects of the present invention to provide methods for block comparison which require a reduced number of memory accesses.

It is another object of some aspects of the present invention to provide methods for reducing the percentage of time spent on memory access in motion estimation.

In preferred embodiments of the present invention, a processor and a plurality of SIMD registers which are preferably included in the processor, are used for motion estimation of a block in a current frame. The block in the current frame is compared to a plurality of background blocks in a preceding frame, and the block in the preceding frame most closely resembling the block in the current frame (hereinafter referred to as the current block) is chosen. The processor is capable of reading into each of the registers a word of 16 bytes beginning at an address in a main memory which is aligned to the size of the registers, i.e., which is an integral multiple of 16 bytes. In order to facilitate efficient loading of the blocks of the preceding frame into the registers, the preceding frame is loaded into the main memory in a predetermined known alignment. Although in the predetermined alignment the beginning address may be aligned with the 16-byte registers, preferably the beginning address is deliberately out of alignment with the 16-byte registers.

When loading into the registers a desired word which is not precisely aligned in the memory or whose alignment is not known, two load commands are required to load two 16-byte aligned words that include all the bytes of the desired word. In addition, a permute command is required to bring the desired word into a single register. The use of the predetermined alignment, in accordance with the principles of the present invention, allows the use of a relatively fast shift command instead of the slower permute command, since the amount of shift required is known from the predetermined alignment. The time required to perform a shift command is about two to three times less than the time required to perform a permute command.

Preferably, an noted hereinabove, the preceding frame is loaded beginning at an address which is not aligned with respect to the SIMD registers. Preferably, the preceding frame is aligned in the memory so that for each block of the current frame on which motion estimation is to be performed, the rows of an area in the preceding frame that includes the blocks required for comparison in a first iteration of a logarithmic method used in the motion estimation are loaded directly into respective SIMD registers in a minimal number of steps of the processor. Preferably, the preceding frame is aligned on a half-word boundary, i.e., on an 8-byte boundary which is not a 16-byte boundary. By misaligning the preceding frame when it is loaded into the main memory, the method of the present invention enables motion estimation to be carried out faster and more efficiently.

Preferably, the current frame is loaded into the main memory in alignment with the registers. Preferably, the current frame is aligned so that its first row and column fall on full 16-byte boundaries. Thus, the preceding and current frames are misaligned with respect to each other in the main memory, with an 8-byte gap therebetween.

In some preferred embodiments of the present invention, during motion estimation the blocks of the current frame are loaded sequentially into the registers, and each block is kept in the registers for its entire processing term. Preferably, in the first iteration of the logarithmic method, each of the blocks of the current frame is compared to nine neighboring blocks of the previous frame, in three successive stages. In each stage the rows of the current block are compared in parallel to the rows of three blocks located on common rows of the previous frame. The three blocks are partially overlapping so that they include all together 32 pixels in each of the rows, which are represented by 32 bytes. The 32 bytes are properly aligned in the memory so that they can be loaded into two SIMD registers in only two load commands. Preferably, for each of the 16 rows of the three blocks, two load commands are performed to load the data values of the pixels in the row into the registers. The 16 bytes in each of the registers belong respectively to the blocks 8-pixels to the left and to the right of the current block. A shift command is used to move the middle 16 of the 32 bytes into a third SIMD register, and these 16 bytes are compared to the respective row of the current block.

There is therefore provided in accordance with a preferred embodiment of the present invention, a method of comparing a current block in a current frame to a plurality of background blocks in a preceding frame, each block including a matrix of data values arranged in a given number of columns, using a processor which has a plurality of computational registers, each capable of receiving a number of the data values at least equal to the given number by loading the data values from a memory beginning at an address in the memory evenly divisible by the given number, including storing the preceding frame in the memory beginning at an address that is divisible by the given number with a predetermined remainder, loading at least some of the data values of the current block into one or more of the plurality of registers, loading at least some of the data values of one or more of the background blocks into another one or more of the plurality of registers, and comparing the background blocks to the current block using the registers.

Preferably, the method includes storing the current frame in the main memory beginning at an address divisible by the given number.

Preferably, loading the current block to the registers includes loading the current block only once for each block.

Preferably, loading the data values of the background blocks into the registers includes loading respective first and second rows of first and second ones of the background blocks and shifting the first and second rows to obtain in one of the registers a row of a third block overlapping the first and second blocks.

Preferably, the given number is sixteen.

Preferably, comparing the blocks includes comparing in accordance with a logarithmic iterative algorithm.

Further preferably, comparing the blocks includes comparing the current block to a plurality of partially overlapping background blocks in the preceding frame.

Alternatively or additionally, comparing the blocks includes loading and comparing all the data values of the background blocks situated on a common row of the preceding frame, in each iteration, before loading data values from another row.

Preferably, the data values of the preceding frame are loaded into the registers at most once in each iteration.

Preferably, comparing the blocks includes estimating motion of the current block relative to the preceding frame based on the comparison.

Preferably, the predetermined remainder is not equal to zero.

Further preferably, the predetermined remainder is equal to half the given number.

There is further provided in accordance with a preferred embodiment of the present invention, apparatus for comparing a current block in a current frame to a plurality of background blocks in a preceding frame, each block including a matrix of data values arranged in a given number of columns, including a main memory, in which the data values of the preceding frame are stored beginning at an address that is not evenly divisible by the given number, and a processor, including a plurality of computational registers, each capable of receiving the given number of data values, by loading the data values from the main memory beginning at an address evenly divisible by the given number.

Preferably, data values describing the current frame are stored in the main memory beginning at an address evenly divisible by the given number.

Preferably, the processor includes an AltiVec PowerPC.

Preferably, the processor loads the current block to the registers only once during a comparison process.

Preferably, the processor loads respective first and second rows of first and second ones of the background blocks and shifts the first and second rows to obtain in one of the registers a row of a third block overlapping the first and second blocks.

Preferably, the processor compares the background blocks to the current block by loading and comparing all the data values of the background blocks situated on a common row of the preceding frame, in each of a plurality of iterations, before loading data values from another row.

Preferably, the data values of the preceding frame are loaded into the registers at most once in each of a plurality of iterations in an iterative comparison method.

There is further provided in accordance with a preferred embodiment of the present invention, a digital video processing system, including apparatus for compressing video frames, the compressing including comparing a current block in a current frame to a plurality of background blocks in a preceding frame, each block including a matrix of data values arranged in a given number of columns, including a main memory, in which the data values of the preceding frame are stored beginning at an address that is not evenly divisible by the given number, and a processor, having a plurality of computational registers, each capable of receiving the given number of data values, by loading the data values from the main memory beginning at an address evenly divisible by the given number, and a network interface for transmission of the compressed video frames.

Preferably, the system includes a video on demand system.

There is further provided in accordance with a preferred embodiment of the present invention, a digital video camera, including a camera for acquiring a plurality of video frames, and apparatus for compressing at least some of the plurality of video frames, the compressing including comparing a current block in a current frame to a plurality of background blocks in a preceding frame, each block including a matrix of data values arranged in a given number of columns, including a main memory, in which the data values of the preceding frame are stored beginning at an address that is not evenly divisible by the given number; and a processor, having a plurality of computational registers, each capable of receiving the given number of data values, by loading the data values from the main memory beginning at an address evenly divisible by the given number.

The present invention will be more fully understood from the following detailed description of the preferred embodiments thereof, taken together with the drawings, in which:

DETAILED DESCRIPTION OF PREFERRED EMBODIMENTS

Figure 1:
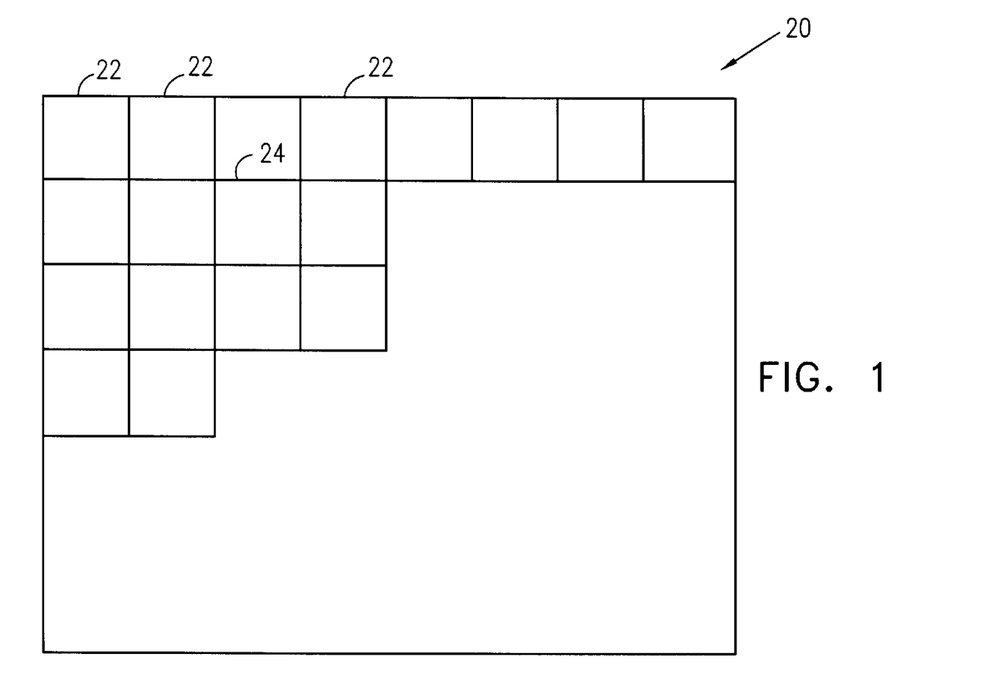
FIG. 1 is a schematic diagram of a video frame, which is prepared for compression in accordance with a preferred embodiment of the present invention.

FIG. 1 is a schematic diagram of a video frame 20 which is compressed using motion estimation, in accordance with a preferred embodiment of the present invention. Frame 20 is part of a video frame-sequence which is preferably compressed in accordance with a compression method such as MPEG 1/2/4 or H.261/263. Frame 20 is divided to a plurality of blocks 22, and each block is represented in a compressed data stream by the location of a similar block in a preceding frame. Preferably, each block 22 comprises 16×16 pixels, and the width and length of frame 20 (measured in columns and rows of pixels) are both divisible by 16.

Figure 2:
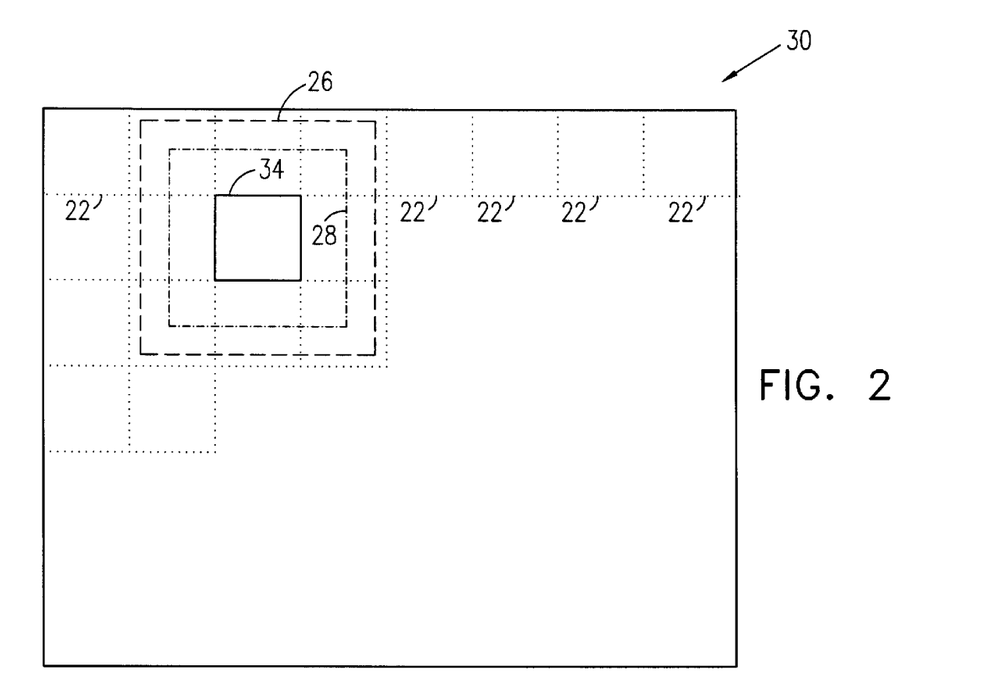
FIG. 2 is a schematic diagram of a video frame which is used in motion estimation of the blocks of the frame of FIG. 1, in accordance with a preferred embodiment of the present invention.

FIG. 2 is a schematic diagram of a video frame 30 which is used as a preceding frame in motion estimation of the blocks of frame 20, in accordance with a preferred embodiment of the present invention. A current block 24 (FIG. 1) is compared to a plurality of blocks in an area 26 in preceding frame 30. Area 26 is preferably centered around a block 34 of frame 30 which has the same coordinates as block 24 of frame 20, and extends beyond block 34 by 15 pixels in each direction. Preferably, current block 24 is compared only to a few blocks in area 26 in accordance with a logarithmic method described hereinbelow.

Figure 3:
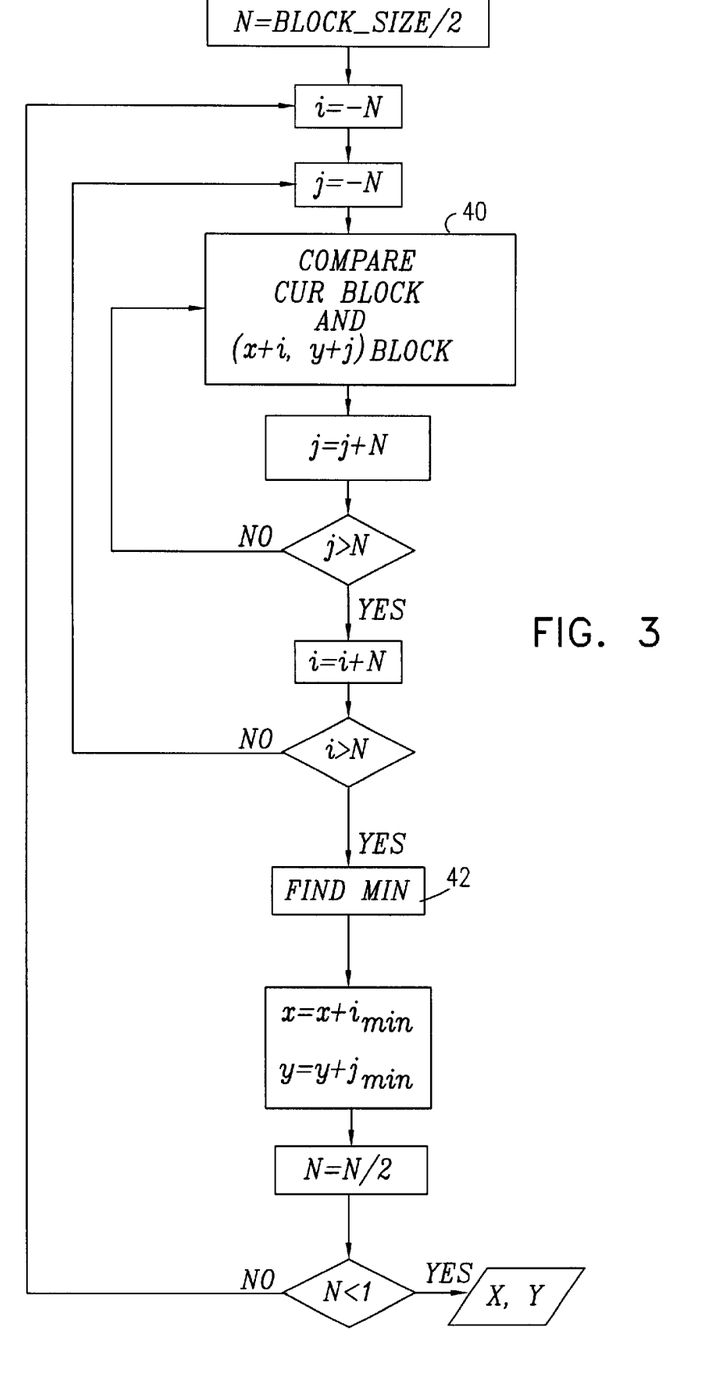
FIG. 3 is a flow chart illustrating a logarithmic method of motion estimation, in accordance with a preferred embodiment of the present invention.

FIG. 3 is a flow chart of the logarithmic method of motion estimation, in accordance with a preferred embodiment of the present invention. The method includes several iterations, in each of which the current block is compared to nine blocks in the preceding frame. These nine blocks include a center block and eight blocks surrounding the center block and displaced from the center block by a fixed number of pixels N in one or two directions (horizontal and vertical). Preferably, the center block of the first iteration (block 34 in FIG. 2) is in the same location in its frame as current block 24. In subsequent iterations, the one of the nine blocks in the preceding iteration most similar to the current block is used as the center block for choosing the nine blocks of the next iteration.

In each iteration, the number of pixels N between the center block and the surrounding blocks is equal to half of the number of pixels N in the preceding iteration. Preferably, in the first iteration, N is half the block size, i.e., 8 pixels, and in subsequent iterations N is four, two and one pixel.

For example, in the first iteration of the logarithmic method, block 24 which is represented by its top left coordinates (x,y) is compared to nine blocks of 16×16 pixels each in preceding frame 30, the nine blocks having the coordinates defined in equation 1:

$$(x+i, y+j) \quad i=-8,0,8, \quad j=-8,0,8 \tag{1}$$

In FIG. 2, these blocks together cover an area 28.

The current block is compared to each of the nine blocks in the preceding frame, as indicated in step 40 of FIG. 3. At this stage, each of the nine blocks receives a scalar value indicative of the correlation with the current block. Typically, the scalar value is equal to a sum of the absolute differences or square differences between the values of the pixels in each of the nine blocks and the corresponding pixels in the current block. As indicated in step 42, the block having the smallest difference relative to the current block is found, and this block is used as the center block of the next iteration.

Figure 4:
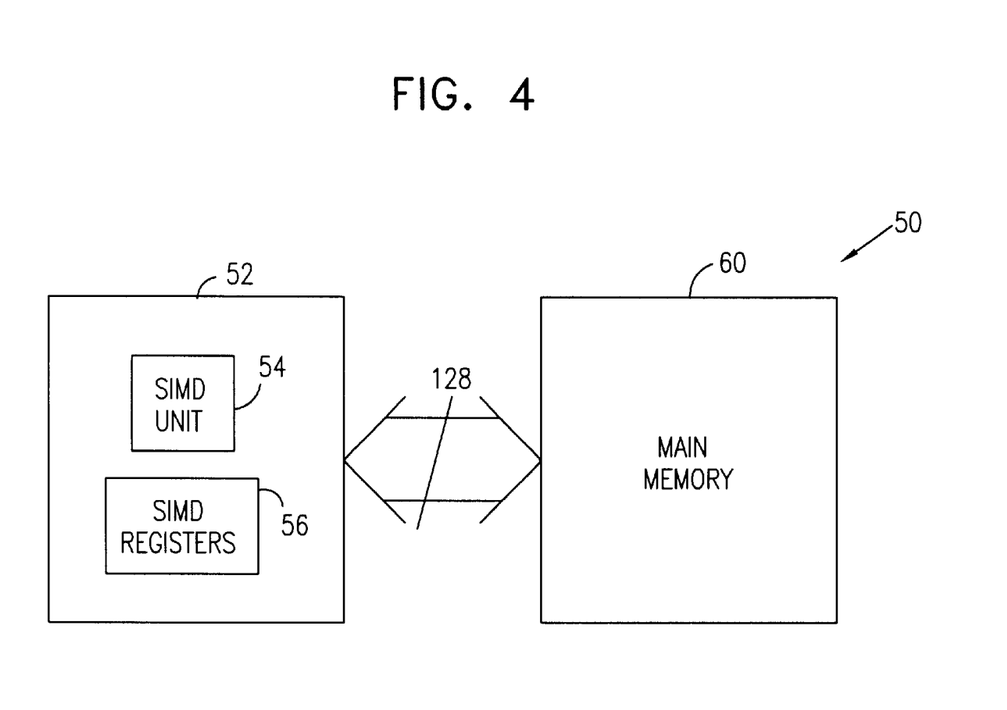
FIG. 4 is a schematic block diagram of an image compressor which compresses the frame of FIG. 1, in accordance with a preferred embodiment of the present invention.

FIG. 4 is a schematic block diagram of a computer used as an image compressor 50, which compresses frame 20. Compressor 50 includes a processor 52, preferably a PowerPC processor, which is available from Motorola. Processor 52 has an AltiVec SIMD unit 54, which is described in the above mentioned AltiVec Web pages. SIMD unit 54 has 32 registers 56 each of which receives and processes 16 bytes concurrently. Compressor 50 further comprises a main memory 60 in which data used by processor 52 is temporarily stored.

Processor 52 is designed to load data from main memory 60 to registers 56 only from locations in the memory which are aligned to a 16 byte address, i.e., data blocks beginning at an address in the memory that is an integer multiple of 16. In order to load 16 bytes that are not properly aligned, it is necessary to load the two 16-byte words which together include the desired 16 bytes into two SIMD registers and then perform a permute command, available for this purpose.

Figure 5:
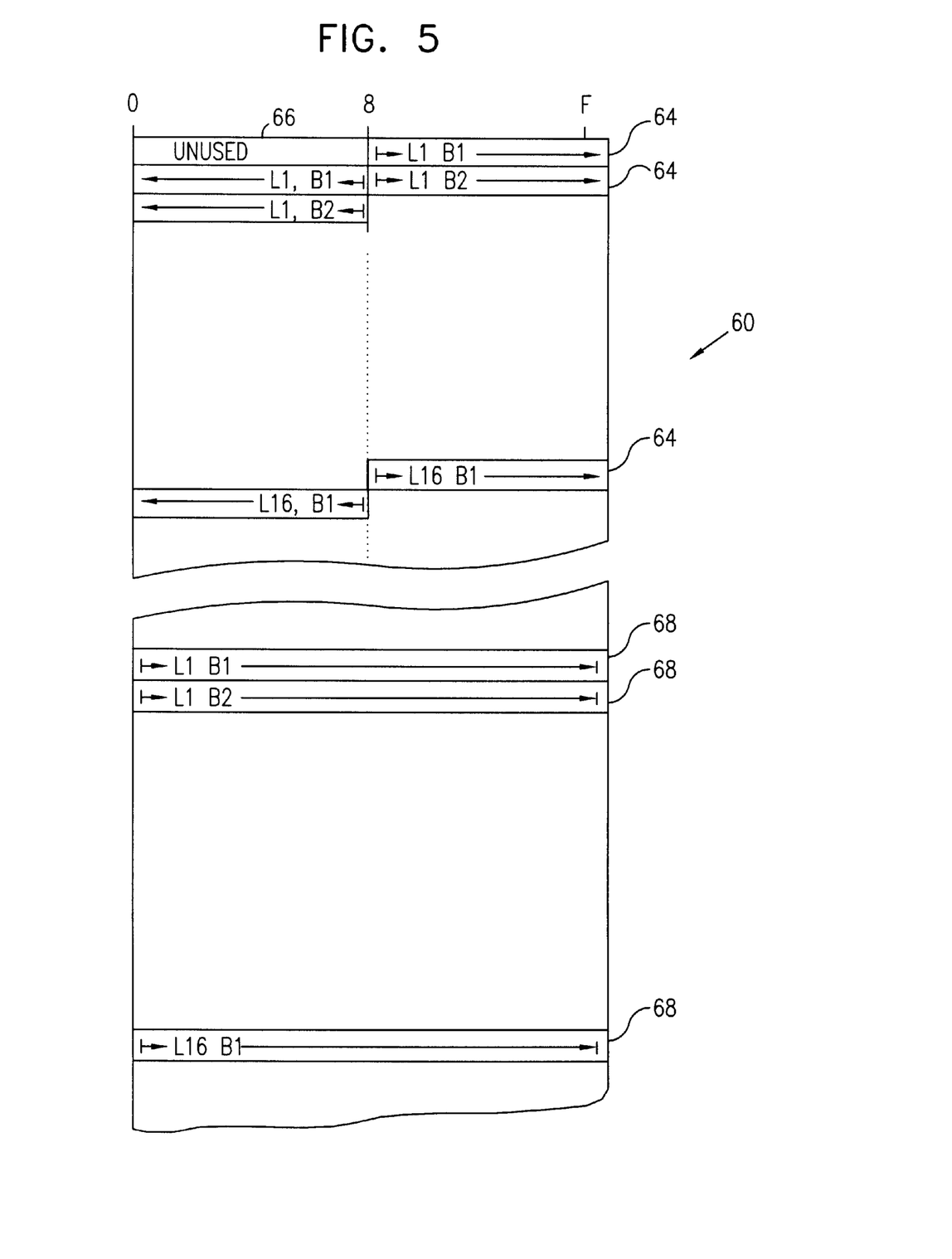
FIG. 5 is a schematic illustration of a portion of a main memory storing data representing the frame of FIG. 1, in accordance with a preferred embodiment of the present invention.

FIG. 5 is a schematic illustration of a portion of main memory 60 storing data representing current frame 20 and preceding frame 30, in accordance with a preferred embodiment of the present invention. Each pixel in frames 20 and 30 is represented by one respective byte in memory 60. Therefore, each row of 16 pixels of blocks 22 is represented by 16 consecutive bytes in memory 60, occupying one line in the representation of FIG. 5. A plurality of data lines 64 describing the rows of the blocks of preceding frame 30 are aligned in memory 60 to 8-bytes, but not to 16-bytes. Each of the rows is labeled in the figure according to its row number (L1 through L16) and its block number (B1 through B99 for standard 176×144 frames). The 8 bytes 66 preceding the data representing frame 30 are unused or are used for data unrelated to frame 30.

Preferably, a plurality of data lines 68 describing the rows in current frame 20 of the sequence being compressed, are loaded into memory 60 at a 16-byte alignment, so that block 24 may be loaded simply into registers 56. Alternatively, the data describing current frame 20 is aligned in memory 60 at the same alignment as the data describing frame 30.

Figure 6A:
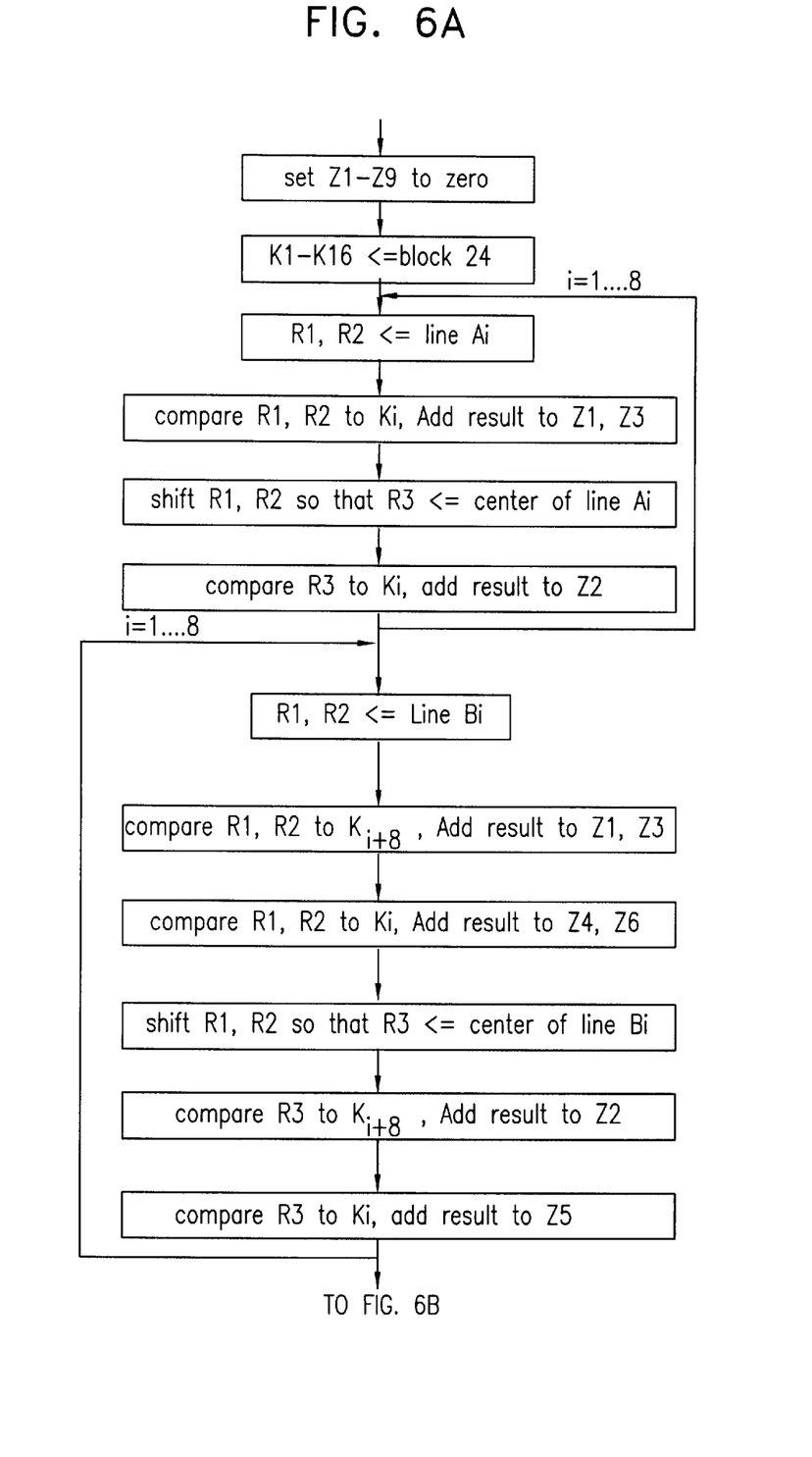
FIGS. 6A and 6B are a flow chart illustrating a method of motion estimation, in accordance with a preferred embodiment of the present invention.
Figure 6B:
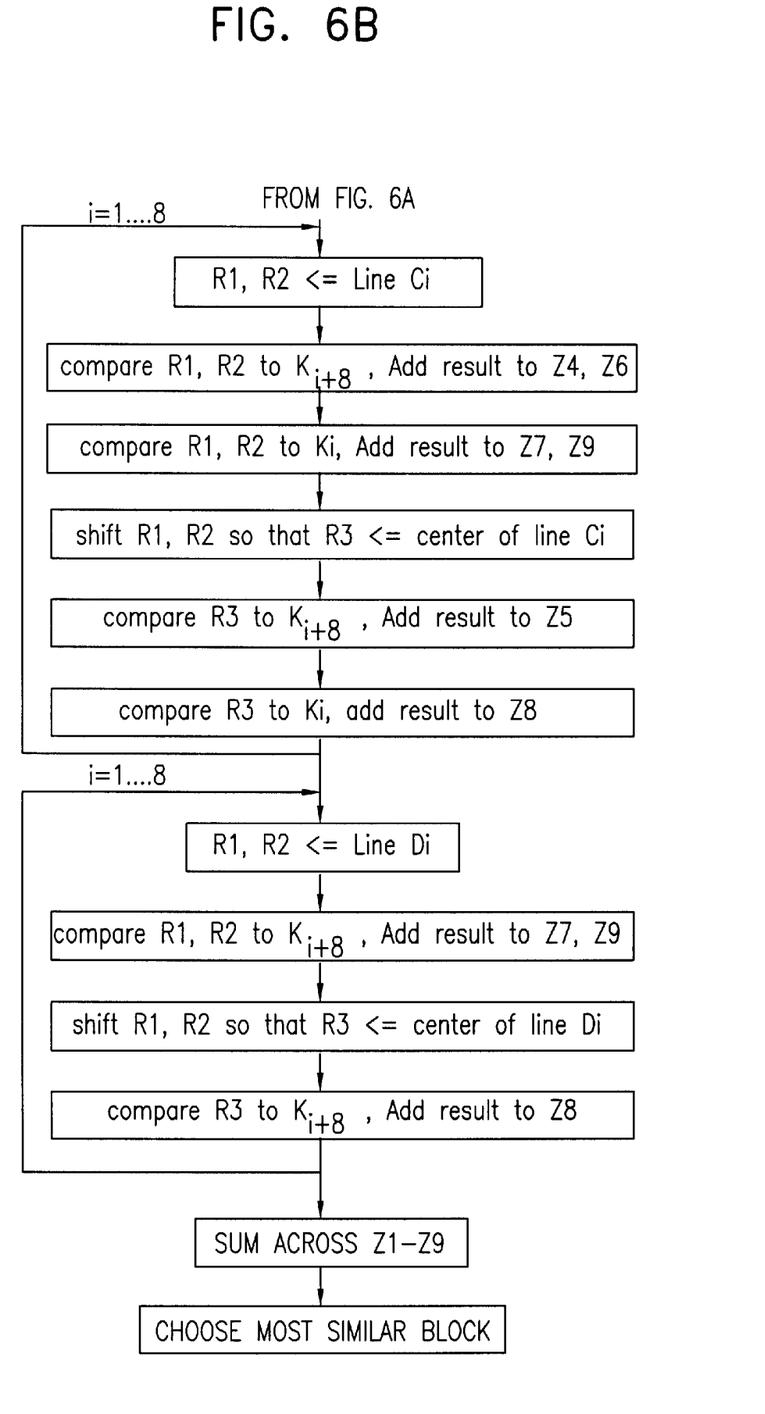
Figure 7:
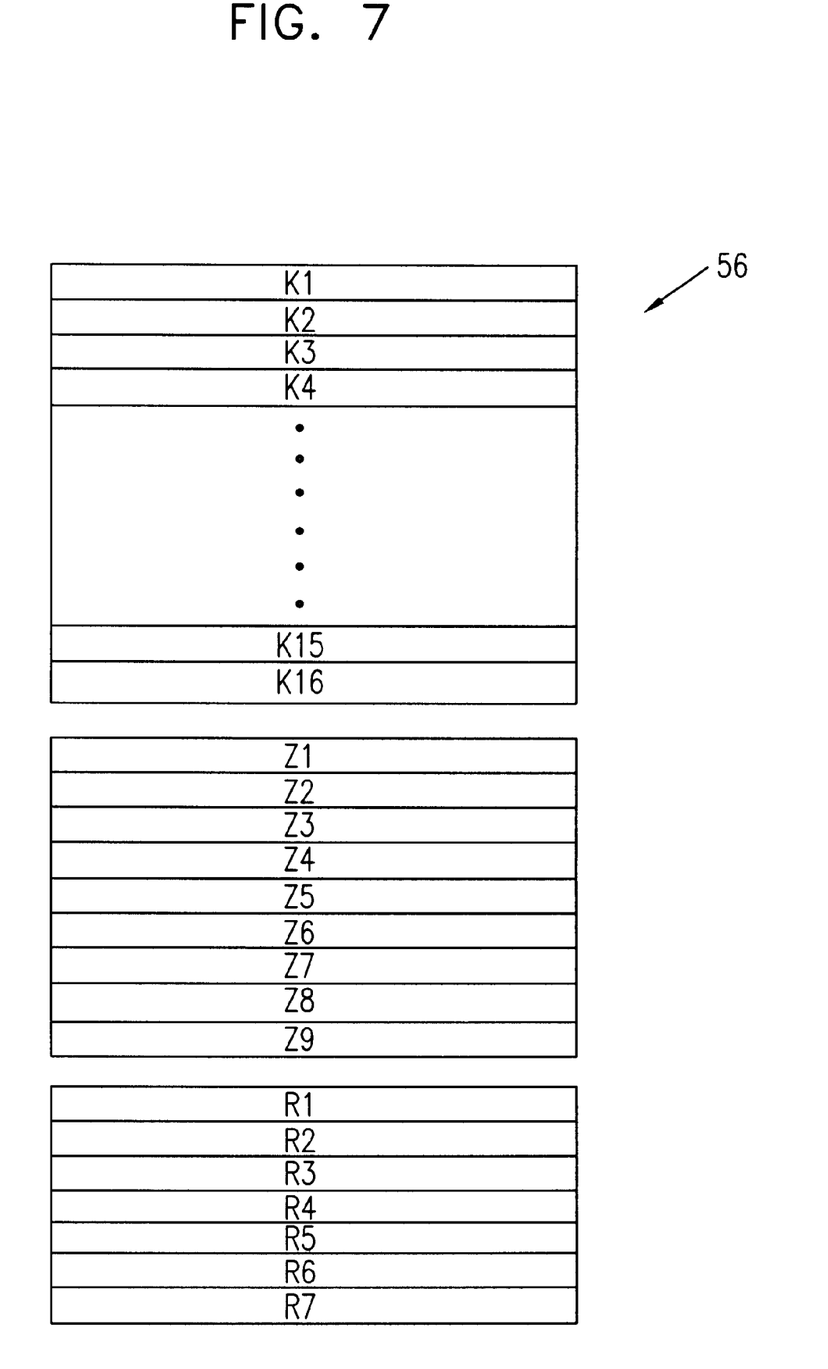
FIG. 7, is a schematic illustration of a plurality of registers of the image compressor of FIG. 4, in accordance with a preferred embodiment of the present invention.

FIG. 6 is a flow chart illustrating actions performed by processor 52 in motion estimation, in accordance with a preferred embodiment of the present invention. Reference is also made to FIG. 7, which is a schematic illustration of registers 56, and to FIG. 8 which is a schematic illustration of area 28, which is covered by the nine blocks in preceding frame 30 which are compared to current block 24 during the first iteration of the logarithmic method of motion estimation.

Figure 8:
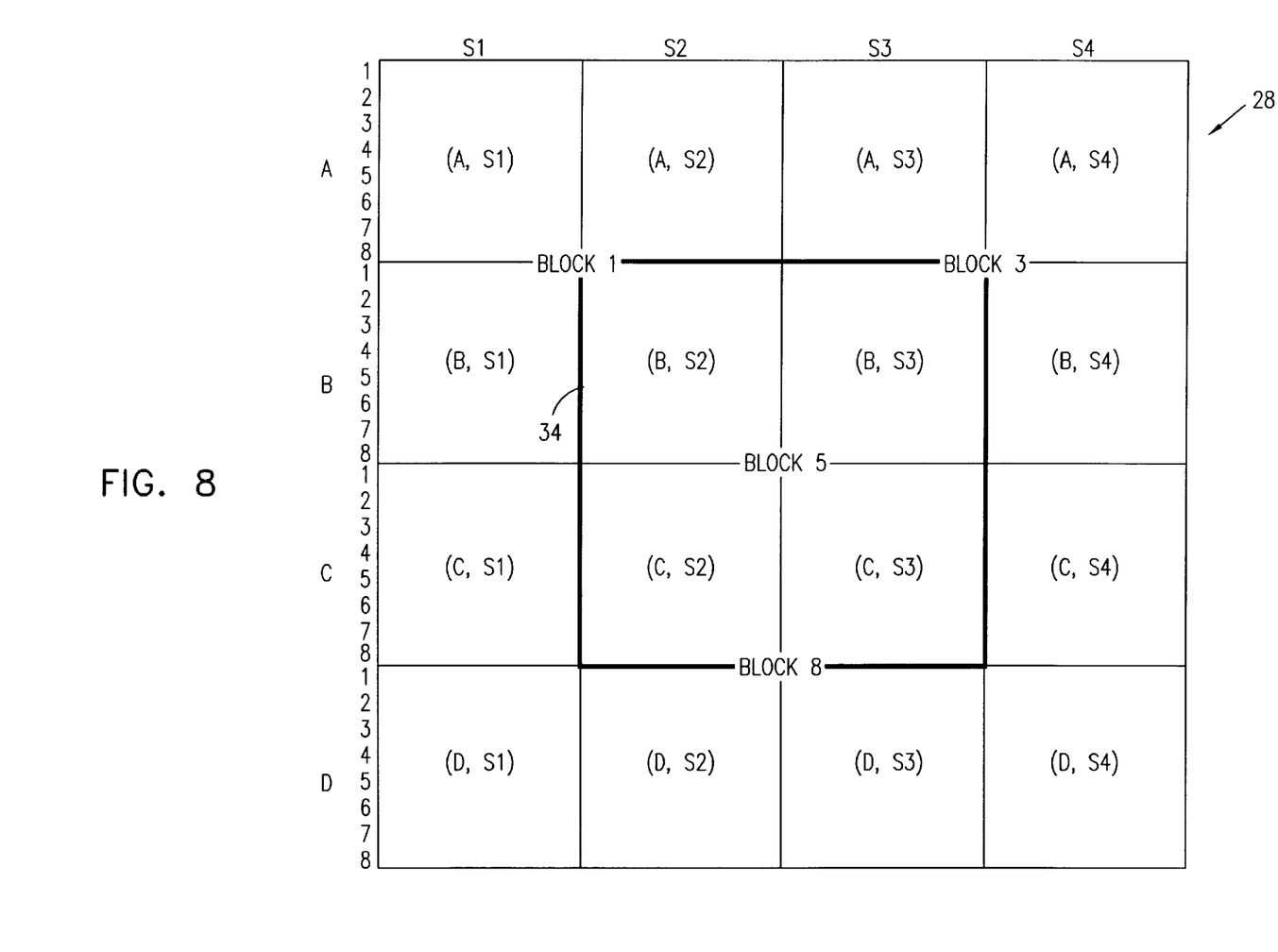
FIG. 8 is a schematic illustration of an area of interest in a video frame, useful in understanding a first iteration of the method of FIG. 6.

Area 28, shown in detail in FIG. 8, comprises 32 rows, each of which includes 32 pixels. For the explanation hereinbelow, the 32 rows are divided into four groups marked A, B, C and D. The columns of area 28 are divided for the following explanation into four sectors S1, S2, S3 and S4, each of which includes eight pixels. Thus, area 28 includes sixteen 8×8 blocks which are used to make up the nine blocks compared to current block 24.

A center block 34 (FIG. 2) of the first iteration has the same coordinates as block 24, and therefore includes small blocks (B,S2), (B,S3), (C,S2) and (C,S3), shown in FIG. 8, and is referred to in the following description as BLOCK5. BLOCK1 is the 16×16 block displaced by 8 pixels to the left and by 8 pixels up from BLOCK5 and covers small blocks (A,S1), (A,S2), (B,S1) and (B,S2). Likewise, BLOCK2 and BLOCK3 cover blocks on rows A and B corresponding to sectors S2 and S3, and S3 and S4, respectively. BLOCK4 covers blocks (B,S1), (B,S2), (C,S1) and (C,S2); and BLOCK6 covers small blocks (B,S2), (B,S3), (C,S2) and (C,S3). BLOCK7, BLOCK8 and BLOCK9 likewise cover from left to right three 16×16 blocks on the rows of C and D.

Each current block which undergoes motion estimation, such as block 24 (FIG. 1), is loaded in its entirety to registers 56 (FIG. 4). Block 24 is preferably loaded only once into the registers during the entire compression process. Each row of block 24 is loaded into one register, such that all together the current block occupies 16 registers, identified as K1–K16 in FIG. 7. Nine registers, identified in FIG. 7 as registers Z1–Z9, are used to accumulate the differences between the nine blocks of preceding frame 30 and current block 24. Registers Z1–Z9 are preferably set to zero each time a new block 24 is loaded into registers K1–K16.

Preferably, the 32 bytes representing the top row A1 of area 28 are loaded into two registers 56 (R1, R2 in FIG. 7) using two load commands. Using one "compare" command in processor 52, R1, representing sectors S1 and S2 of row A1, is compared to K1 which represents the top row of current block 24. The result is added to Z1, which accumulates the results of comparisons of BLOCK1. Likewise, R2, representing sectors S3 and S4 of row A1, is compared to K1, and the result is added to Z3, which accumulates the results of comparisons of BLOCK3.

Preferably, the comparison between K1 and R1 is performed using the following sequence of SIMD commands:

R4=subtract_saturate K1 from R1
R5=subtract_saturate R1 from K1
R6=R4 logical_or R5
Z1=Z1+R6, in which subtract_saturate means that if the result of subtraction is less than zero, the result is set to zero. This sequence of commands is used instead of an "absolute" command, which is not implemented in SIMD unit 54. Each command is performed simultaneously and separately on each of the 16 bytes of the registers which are operands of the commands.

Thereafter, a shift command is performed, bringing sectors S2 and S3 of row A1 into a single register, preferably R3, although R1 and R2 are also suitable. Register R3 is compared to K1, and the result is added to Z2 which accumulates the results of comparisons with BLOCK2.

The above process is preferably repeated for each of rows A2 to A8. Each of the rows is preferably loaded into R1 and R2, and they are then compared to the corresponding one of registers K2–K8 which respectively represent the second to eighth rows of current block 24.

Rows B1 to B8 are treated in the same manner as rows A1 to A8, but in addition to being compared to registers K9–K16, which represent rows 9–16 of current block 24, they are also compared respectively to registers K1–K8 in their capacity of being a part of blocks BLOCK4, BLOCK5 and BLOCK6. The results of the comparisons to K9–K16 are accumulated in Z1, Z2 and Z3, while the comparisons to K1–K8 of current block 24 are accumulated in Z4, Z5 and Z6, as appropriate. Thus, each of rows B1 to B8 is used for six comparisons, two comparisons for each pair of sectors, i.e., (S1,S2), (S3,S4) and (S2,S3).

Rows C1 to C8 and D1 to D8 are loaded and compared in a similar manner to rows B1 to B8 and A1 to A8, respectively.

It is noted that each byte in memory 60 is loaded only once into registers 56 during the first iteration, and all the required comparisons in the first iteration using this byte are performed while the byte is in the registers.

After the comparisons are completed, the accumulated results in each of registers Z1–Z9 are added up, using a "sum_across unsigned" command which adds up the 16 bytes of its operand. The sums thus give nine correlation indicators, which correspond to the nine blocks to which the current block is compared. The block having the correlation indicator with the lowest value (indicative of the closest similarity), is used as a new center block for the next iteration. In the discussion that follows, only the columns of the new center block are considered. The rows are neglected, because the rows are handled one-by-one in any event, while the columns are processed sixteen at once. For example, BLOCK1, BLOCK4 and BLOCK7 are located on the same columns and in the following discussion are handled in substantially the same manner.

The subsequent iterations are performed in a similar manner to the first iteration. In these iterations, fewer pixels are needed for comparison since the compared blocks have more pixels in common. Thus, in the second iteration, 24 rows are loaded, each row including 24 pixels required for the comparison. In the third iteration, 20 rows are loaded, each row including 20 required pixels, and in the fourth iteration 18 rows are loaded, each row including 18 required pixels.

In order to load the required pixels, it is necessary to load all of the 16-byte words containing the required pixels. Therefore, in none of the iterations is it possible to perform fewer than two loads per row. Whether two or three loads are required for each row depends on the location of the center block in preceding frame 30 for the present iteration relative to the 16-byte alignment lines which coincide with the right and left borders of area 28.

Figure 9:
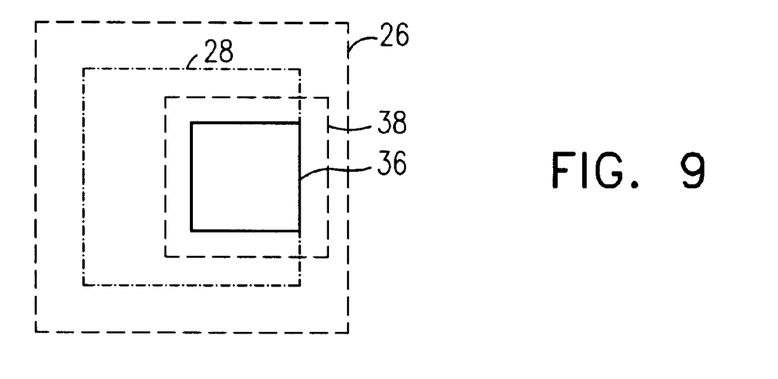
FIGS. 9 and 10 are schematic illustrations of an area of interest in a video frame, useful in understanding a second iteration of the method of FIG. 6.

FIG. 9 is a schematic illustration of parts of area 26 which are compared to current block 24 during a second iteration of the logarithmic method of motion estimation. This figure illustrates a case in which the first column of the new center block 36 is on a 16-byte alignment line (i.e., has an address in memory 60 that is evenly divisible by 16), which is on the border of area 28. The portion of area 26 used in the second iteration is indicated in FIG. 9 by a frame 38. In this case three loads are required: one for the 16 bytes of the center block 36 and two more for those bytes of the blocks adjacent to the left and right boundaries of frame 38 which do not overlap with the bytes of the center block. This case occurs in the second iteration when the new center block covers the columns of BLOCK1 or BLOCK3 (FIG. 8).

Figure 10:
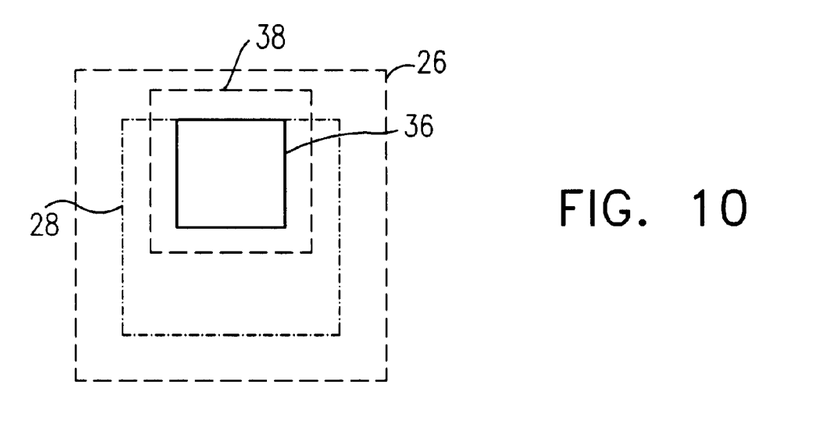

FIG. 10 is a schematic illustration of portions of area 26 which are compared to current block 24 during the second iteration of the logarithmic method of motion estimation, in an alternative case in which the first column of the new center block 36 is not on a 16-byte alignment line, i.e., on the border of area 28. In this case only two loads are required, since the columns of the entire area 38 required for comparison is within the columns of area 28, the lines of which may be loaded in two load commands. This case occurs in the second iteration when the new center block covers the columns of BLOCK2 (FIG. 8).

It is noted that in the third and fourth iterations, due to the nature of the present logarithmic search method, if the first column of the center block is not on one of the 16-byte alignment lines, only two loads are required.

Figure 11:
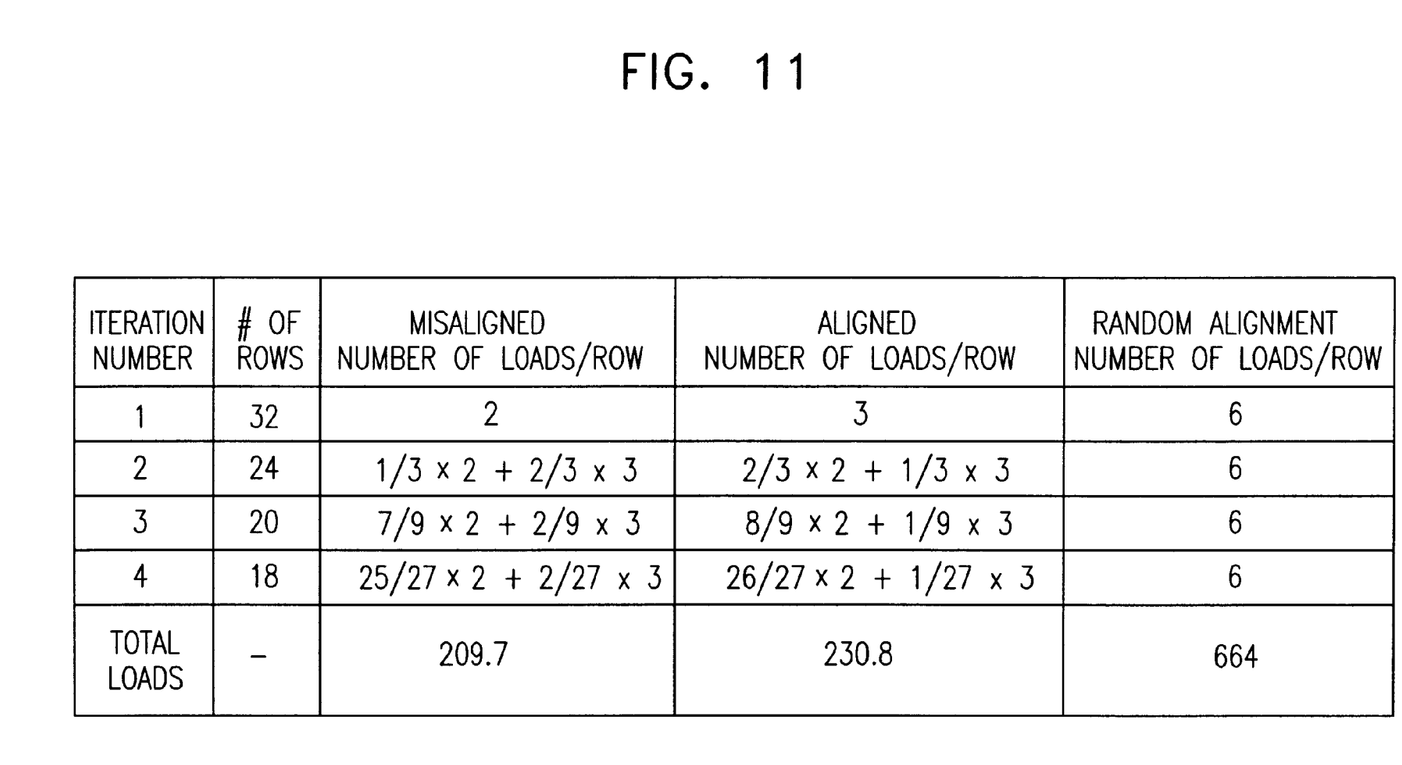
FIG. 11 is a table comparing the number of load commands required for various alignments of the frame of FIG. 2, in accordance with a preferred embodiment of the present invention.

FIG. 11 compares the number of load commands required when the data describing frame 30 is "misaligned" in memory 60, in accordance with the preferred embodiment of the present invention described hereinabove, versus the number that would be required if the data were loaded with the first column of frame 30 aligned with one of the 16-byte alignment lines in the memory. An additional column shows the number of loads required when frame 30 is randomly aligned in memory 60, i.e., wherein the beginning address is not predetermined or known, so that each block is loaded separately into the registers. It is observed that the method of the present invention reduces the total number of loads required substantially by comparison with the prior art.

The data in FIG. 11 is statistical in nature due to the dependence of the number of loads in iterations 2, 3, and 4 on the results of the comparisons. The data in FIG. 11 is calculated on the assumption that in each iteration, any of the nine compared blocks in the preceding frame has an equal chance of being the most closely correlated block. However, in most video scenes, there are generally low rates of movement, and the most closely correlated block is most often one that is close or identical to the current block. Therefore, the "misaligned" case, in accordance with the principles of the present invention, usually achieves even better relative results than indicated in FIG. 11.

It is noted that if current frame 20 is also misaligned, loading of the current block will require 16 more load commands than when frame 20 is aligned.

FIG. 11 assumes that all memory accesses require an equal amount of time. However, when processor 52 has a cache memory, as most processors (including the AltiVec PowerPC) have, the first access to a byte requires more time than later accesses. Therefore, the total number of different 16-byte words accessed has a large influence on the performance of the method. When frame 30 is misaligned in accordance with the present invention, only two 16-byte words are accessed in the first iteration. For the second iteration, only if one of the blocks to the right or left of the center block is chosen, is it necessary to load a third 16-byte word. By contrast, if frame 30 is aligned in memory 60, three loads are performed for each row in the first iteration.

Figure 12:
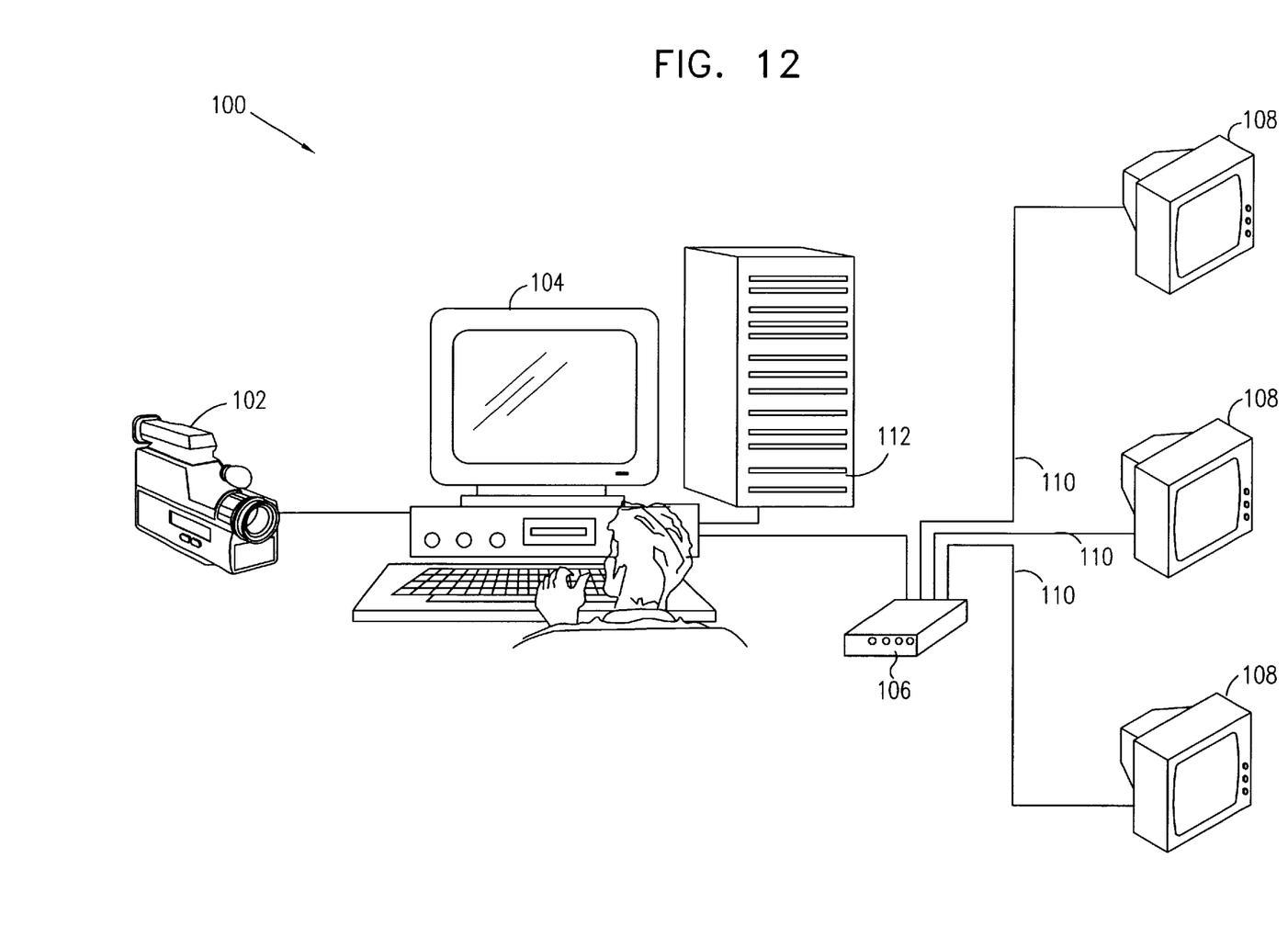
FIG. 12 is a schematic illustration of a video on-demand system, in accordance with a preferred embodiment of the present invention.

FIG. 12 is a schematic illustration of a video on-demand system 100, in accordance with a preferred embodiment of the present invention. System 100 preferably comprises a video camera 102, which acquires video frames and passes signals representing the frames to a computer 104. Preferably, computer 104 processes the signals to improve the visibility of the video frames, as is known in the art. In addition, computer 104 compresses the video frames so that they may be more readily stored and/or transmitted over a communication network. Preferably, computer 104 comprises an image compressor, such as image compressor 50 illustrated in FIG. 4. System 100 further comprises a modem 106 which passes the compressed frames over a communication network 110 to end systems, such as televisions 108.

Alternatively or additionally, computer 104 receives video frames from sources other than camera 102, such as, for example, a memory library 112 in which a plurality of video movies are stored. In this example, a user of television 108 may order a particular movie from library 112, to be displayed on the television. The video frames of the movie are passed to computer 104 where they are compressed in a manner described above and the compressed frames are passed to television 108. Alternatively or additionally, the video frames stored in library 112 are compressed by computer 104 when they are first stored in the library.

It will be appreciated that the preferred embodiments described above are cited by way of example, and the full scope of the invention is limited only by the claims.

What is claimed is:

1. A method of comparing a current block in a current frame to a plurality of background blocks in a preceding frame, each block comprising a matrix of data values arranged in a given number of columns, using a processor and a plurality of computational registers, each capable of receiving a number of the data values at least equal to the given number by loading the data values from a memory beginning at an address in the memory evenly divisible by the given number, comprising:

storing the preceding frame in the memory beginning at an address that is divisible by the given number with a predetermined non-zero remainder;

loading at least some of the data values of the current block into one or more of the plurality of registers;

loading at least some of the data values of one or more of the background blocks into another one or more of the plurality of registers; and comparing the background blocks to the current block using the registers.

2. A method according to claim 1, and comprising storing the current frame in the main memory beginning at an address divisible by the given number.

3. A method according to claim 1, wherein loading the current block to the registers comprises loading the current block only once for each block.

4. A method of comparing a current block in a current frame to a plurality of background blocks in a preceding frame, each block comprising a matrix of data values arranged in a given number of columns, using a processor and a plurality of computational registers, each capable of receiving a number of the data values at least equal to the given number by loading the data values from a memory beginning at an address in the memory evenly divisible by the given number, comprising:

storing the preceding frame in the memory beginning at an address that is divisible by the given number with a predetermined remainder;

loading at least some of the data values of the current block into one or more of the plurality of registers;

loading at least some of the data values of one or more of the background blocks into another one or more of the plurality of registers, including loading respective first and second rows of first and second ones of the background blocks and shifting the first and second rows to obtain in one of the registers a row of a third block overlapping the first and second blocks; and comparing the background blocks to the current block using the registers.

5. A method according to claim 1, wherein the given number is sixteen.

6. A method of comparing a current block in a current frame to a plurality of background blocks in a preceding frame, each block comprising a matrix of data values arranged in a given number of columns, using a processor and a plurality of computational registers, each capable of receiving a number of the data values at least equal to the given number by loading the data values from a memory beginning at an address in the memory evenly divisible by the given number, comprising:

storing the preceding frame in the memory beginning at an address that is divisible by the given number with a predetermined remainder;

loading at least some of the data values of the current block into one or more of the plurality of registers;

loading at least some of the data, values of one or more of the background blocks into another one or more of the plurality of registers; and comparing the background blocks to the current block using the registers in accordance with a logarithmic iterative algorithm.

7. A method according to claim 6, wherein comparing the blocks comprises comparing the current block to a plurality of partially overlapping background blocks in the preceding frame.

8. A method according to claim 6, wherein comparing the blocks comprises loading and comparing all the data values of the background blocks situated on a common row of the preceding frame, in each iteration, before loading data values from another row.

9. A method of comparing a current block in a current frame to a plurality of background blocks in a preceding frame, each block comprising a matrix of data values arranged in a given number of columns, using a processor and a plurality of computational registers, each capable of receiving a number of the data values at least equal to the given number by loading the data values from a memory beginning at an address in the memory evenly divisible by the given number, comprising:

storing the preceding frame in the memory beginning at an address that is divisible by the given number with a predetermined remainder;

loading at least some of the data values of the current block into one or more of the plurality of registers;

loading at least some of the data values of one or more of the background blocks into another one or more of the plurality of registers; and comparing the background blocks to the current block using the registers in accordance with a logarithmic iterative algorithm, wherein the data values of the preceding frame are loaded into the registers at most once in each iteration.

10. A method according to claim 1, wherein comparing the blocks comprises estimating motion of the current block relative to the preceding frame based on the comparison.

11. A method according to claim 1, wherein the predetermined remainder is equal to half the given number.

12. Apparatus for comparing a current block in a current frame to a plurality of background blocks in a preceding frame, each block comprising a matrix of data values arranged in a given number of columns, comprising:

a main memory, in which the data values of the preceding frame are stored beginning at an address that is not evenly divisible by the given number; and a processor, and a plurality of computational registers, each capable of receiving the given number of data values, by loading the data values from the main memory beginning at an address evenly divisible by the given number.

13. Apparatus according to claim 12, wherein data values describing the current frame are stored in the main memory beginning at an address evenly divisible by the given number.

14. Apparatus according to claim 12, wherein the processor comprises an AltiVec PowerPC.

15. Apparatus according to claim 12, wherein the processor loads the current block to the registers only once during a comparison process.

16. Apparatus according to claim 12, wherein the processor loads respective first and second rows of first and second ones of the background blocks and shifts the first and second rows to obtain in one of the registers a row of a third block overlapping the first and second blocks.

17. Apparatus according to claim 12, wherein the processor compares the background blocks to the current block by loading and comparing all the data values of the background blocks situated on a common row of the preceding frame, in each of a plurality of iterations, before loading data values from another row.

18. Apparatus according to claim 12, wherein the data values of the preceding frame are loaded into the registers at most once in each of a plurality of iterations in an iterative comparison method.

19. A digital video processing system, comprising:

apparatus for compressing video frames, the compressing including comparing a current block in a current frame to a plurality of background blocks in a preceding frame, each block comprising a matrix of data values arranged in a given number of columns, comprising:
- a main memory, in which the data values of the preceding frame are stored beginning at an address that is not evenly divisible by the given number; and
- a processor, comprising a plurality of computational registers, each capable of receiving the given number of data values, by loading the data values from the main memory beginning at an address evenly divisible by the given number; and a network interface for transmission of the compressed video frames.

20. A system according to claim 19, wherein the system comprises a video on demand system.

21. A digital video camera, comprising:

a camera for acquiring a plurality of video frames; and apparatus for compressing at least some of the plurality of video frames, the compressing including comparing a current block in a current frame to a plurality of background blocks in a preceding frame, each block comprising a matrix of data values arranged in a given number of columns, comprising:
- a main memory, in which the data values of the preceding frame are stored beginning at an address that is not evenly divisible by the given number; and
- a processor, comprising a plurality of computational registers, each capable of receiving the given number of data values, by loading the data values from the main memory beginning at an address evenly divisible by the given number.

* * * * *